US006221458B1

(12) United States Patent
Armendariz

(10) Patent No.: US 6,221,458 B1
(45) Date of Patent: Apr. 24, 2001

(54) ORNAMENTAL DEVICE FOR ATTACHMENT TO A SURFACE AND METHOD THEREFOR

(76) Inventor: Teresa Armendariz, 6848 Concord La., Niles, IL (US) 60714

(*) Notice: Subject to any disclaimer, the term of this patent is extended or adjusted under 35 U.S.C. 154(b) by 0 days.

(21) Appl. No.: 09/484,682

(22) Filed: Jan. 18, 2000

(51) Int. Cl.[7] ........................................ B32B 3/06

(52) U.S. Cl. ................................ 428/99; 428/4; 428/8; 428/31; 428/100; 428/133; 428/187; 156/60; 156/391; 248/206.2; 248/310; 40/597

(58) Field of Search ........................... 428/8, 4, 28, 31, 428/133, 187, 100, 99; 156/60, 391; 248/206.2, 310, 315; 40/597, 591; 473/572

(56) References Cited

U.S. PATENT DOCUMENTS 4,835,024 * 5/1989 Hallay ................................. 428/24
4,881,485 * 11/1989 Feinberg .......................... 116/28 R

* cited by examiner

*Primary Examiner*—Deborah Jones
*Assistant Examiner*—Abraham Bahta
(74) *Attorney, Agent, or Firm*—Wallenstein and Wagner, Ltd.

(57) ABSTRACT

An ornamental device for attachment to a surface comprises at least one sheet of ornamental material having an aperture therethrough and an attachment device. The attachment device includes a post having a width, a proximal end and a distal end. The distal end of the post extends through the aperture of the at least one sheet of ornamental material. The attachment device also includes a base member connected to the proximal end of the post. The attachment device further includes a securement device positioned on the distal end of the post to grippingly engage the post and to resist removal of the securement device from the post. The invention further includes a method for making an ornamental device for attachment to a surface.

18 Claims, 1 Drawing Sheet

ORNAMENTAL DEVICE FOR ATTACHMENT TO A SURFACE AND METHOD THEREFOR

CROSS REFERENCES TO RELATED APPLICATIONS

Not Applicable.

STATEMENT REGARDING FEDERALLY-SPONSORED RESEARCH OR DEVELOPMENT

Not Applicable.

REFERENCE TO MICROFICHE APPENDIX

Not Applicable.

BACKGROUND OF THE DISCLOSURE

1. Field of the Invention

The present invention is directed to an ornamental device and, more specifically, to an ornamental device for attachment to a surface, such as the exterior of an automobile. The present invention is also directed to a method for making an ornamental device for attachment to the exterior of an automobile.

2. Background Art

Traditional ornamental devices, as shown in FIG. 1, have been utilized for many years. These devices usually comprise two components: 1) sheets of ornamental material; and 2) a tie for securing the sheets of ornamental material and attaching them to a surface, such as the exterior of an automobile. However, this two-component construction typically encounters difficulty in adhering, without glue, string or other attachments, to other surfaces, such as the exterior of an automobile. Moreover, prior art ornamental devices typically are not reusable, once glued or taped to an automobile.

Other ornamental devices have been developed utilizing a magnet for attachment to the exterior of an automobile. However, magnetic attachment devices typically are not good at resisting shearing loads, and can shift on an automobile surface during movement of the automobile. Moreover, magnets may scratch the exterior of the automobile, and may possibly even interfere with electrical components in the automobile, such as a radio, cellular telephone, etc.

It would be desirable to provide a more economical, reusable ornamental device for attachment to the exterior of an automobile.

It would also be desirable to provide an ornamental device for attachment to the exterior of an automobile that does not damage the exterior of the automobile.

It would also be desirable to provide an ornamental device that does not interfere with the electrical components of an automobile.

It would also be desirable to provide an ornamental device that will maintain adhesion to the exterior of an automobile during a plethora of weather conditions.

These general characteristics of the present invention will become apparent in light of the present specification, claims and drawings.

SUMMARY OF THE INVENTION

The invention comprises an ornamental device for attachment to a surface. The device comprises at least one sheet of ornamental material having an aperture therethrough, and the aperture has a width. Preferably, the ornamental device includes four sheets of ornamental material, each made of paper or plastic.

The attachment device includes a post having a width, a proximal end and a distal end. Preferably, the width of the post is substantially identical at the proximal and distal ends. However, the width of the post may be larger at the distal end than at the proximal end. The distal end of the post extends through the aperture of the at least one sheet of ornamental material, and the post may be made of either plastic or metal.

The attachment device also includes a base member connected to the proximal end of the post. Preferably, the base member is dome-shaped and may be made of either plastic or metal. The base member has a width greater than the width of the aperture of the at least one sheet of ornamental material.

The attachment device further includes a securement device positioned on the distal end of the post, so that the at least one sheet of ornamental material is positioned between the base member and the securement device. The securement device has a width greater than the width of the aperture of the at least one sheet of ornamental material, and the securement device may be made of either plastic or metal. The securement device is configured to grippingly engage the post to resist removal of the securement device from the post.

Preferably, the securement device is a washer, having an aperture having one or more inwardly projecting teeth for engaging the post. Preferably, the washer includes six teeth. The teeth provide resistance to movement of the securement device along the post.

The base member includes a suction cup for enabling attachment of the ornamental device to the surface.

The ornamental device further comprises a gathering member for gathering the at least one sheet of ornamental material into a ball-like configuration. Preferably, the gathering member is an elastic band, a twist-tie or a lock-tie.

The invention further comprises a method for making an ornamental device for attachment to a surface. The method comprises the steps of: 1) providing at least one sheet of ornamental material, having an aperture therethrough, the aperture having a width; 2) providing an attachment device including a post having a width, a proximal end and a distal end, the distal end of the post extending through the aperture of the at least one sheet of ornamental material; the attachment device further including a base member operably connected to the proximal end of the post, the base member having a width greater than the width of the aperture of the at least one sheet of ornamental material; the attachment device further including a securement device, positioned on the distal end of the post, so that the at least one sheet of ornamental material is positioned between the base member and the securement device, the securement device having a width greater than the width of the aperture of the at least one sheet of ornamental material, the securement device further being operably configured to grippingly engage the post, to resist removal of the securement device from the post; the base member further including a suction cup, for enabling attachment of the ornamental device to a surface; 3) gathering the at least one sheet of ornamental material into a ball-like configuration; and 4) securing the base member to the surface of an automobile.

Preferably, the method includes the step of applying an adhesive to the base member prior to attachment of the ornamental device to the surface of an automobile.

DETAILED DESCRIPTION OF THE DRAWINGS

Figure 1:
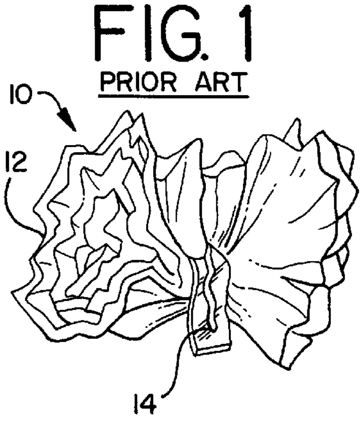
FIG. 1 PRIOR ART
FIG. 1 is a perspective view of an ornamental device according to the prior art.

While this invention is susceptible of embodiment in many different forms, there is shown in the drawings and will be described herein in detail, a specific embodiment, with the understanding that the present invention is to be considered as an exemplification of the principles of the invention and is not intended to limit the invention to the embodiment illustrated.

Traditional ornamental devices, such as ornamental device 10, as shown in FIG. 1, has been utilized for many years. These devices usually comprise sheets of ornamental material 12. Ornamental material 12 can be a plastic, bag-like material rolled together and secured by tie 14. Ornamental material 12 is typically taped, glued, stapled, etc., to the exterior of an automobile. Adhering tie 14 to the exterior of an automobile is a time-consuming process, and can sometimes damage the exterior of the automobile. Moreover, prior art ornamental devices typically are not reusable, once glued or taped to an automobile, because the sheets of ornamental material may be torn or ripped upon removal from the automobile. Further, prior art ornamental devices may shift or become dislodged from the exterior of an automobile while the automobile is moving because magnetic attachment devices typically are not good at resisting shearing loads.

Figure 2:
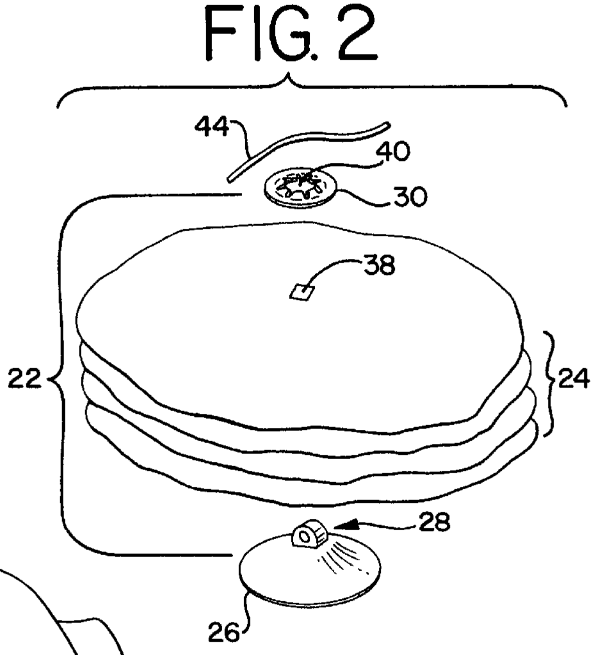
FIG. 2 is a perspective, exploded view of an ornamental device according to the present invention.
Figure 3:
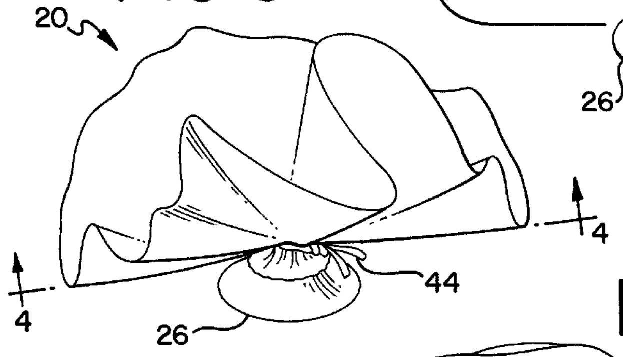
FIG. 3 is a perspective view of the fully-assembled ornamental device of FIG. 2.
Figure 4:
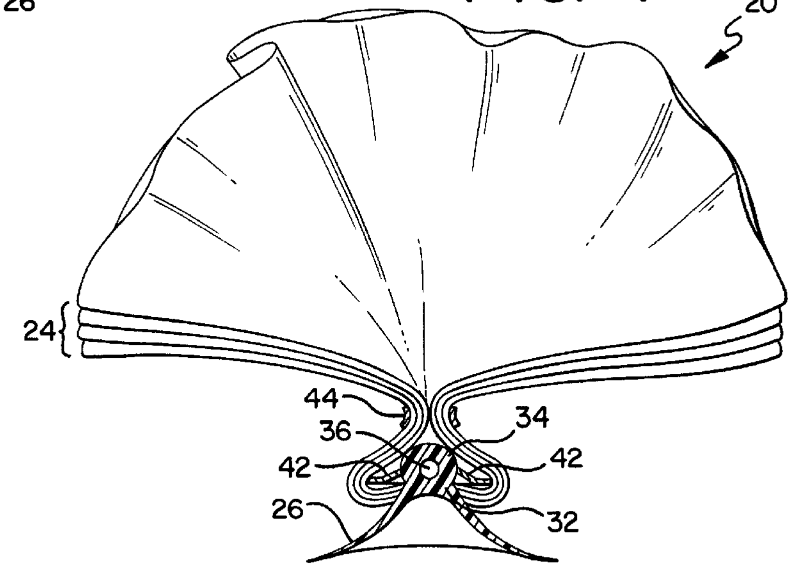
FIG. 4 is a cross-sectional view taken along lines 4—4 of FIG. 3, and looking in the direction of the arrows.

A preferred embodiment of ornamental device 20 of the present invention is shown generally in FIGS. 2–4. Device 20 comprises attachment device 22 and sheets of ornamental material 24.

Attachment device 22 comprises base member 26, post 28 and securement device 30. Preferably, base member 26 is made, at least partially, of plastic. However, the use of other materials, such as rubber, is likewise contemplated. Base member 26 has a dome-like structure and is secured to the exterior of an automobile. Base member 26 can be moistened to maximize adhesion prior to attachment of the ornamental device to the exterior of an automobile. Base member 26 could be monolithically formed, co-extruded or assembled from separate parts and/or dissimilar materials.

Post 28 includes proximal end 32, distal end 34 and aperture 36. Post 28 is an integral part of attachment device 22 and extends upwardly from base member 26 (see FIG. 2). Preferably, post 28 has a width, which is substantially identical at proximal end 32 and distal end 34. However, the width of post 28 may be larger at distal end 34 than at proximal end 32, to, in turn, create a notch (not shown).

Post 28 can be made of a hard material, such as metal, or a soft, malleable material, such as plastic or rubber. Preferably, post 28 is made of plastic. Aperture 36 extends the entire length of post 28, and can accommodate a locking member, such as a pin (not shown), to further fasten securement device 30 to post 28 and base member 26. Preferably, a locking member is not required.

Each layer of ornamental material 24 includes an aperture 38. Preferably, the ornamental device has four (4) substantially identical layers of plastic material (see FIG. 2), although different numbers of sheets and/or different materials could be used. For drawing simplicity, FIG. 3 illustrates only one sheet of ornamental material 24. When in a taut position, the sheets of ornamental material 24 can be placed over post 28 and forced onto post 28 to, in turn, insert post 28 through aperture 38.

Securement device 30 has an aperture 40 having one or more inwardly projecting teeth 42 which fasten and maintain securement device 30 in mating engagement with post 28. Preferably, securement device 30 is a metal washer and has six (6) teeth for grippingly engaging post 28. However, the use of other securement devices, such as a threaded nut, and the use of other materials, such as rubber or plastic, are likewise contemplated. Similarly, the use of differing numbers of teeth 42 on securement device 30 is contemplated.

In a preferred embodiment, post 28 is made of a soft, malleable material, such as plastic, and securement device 30 is made of a hard material, such as metal. Conversely, post 28 may be made of a hard material, such as metal, and securement device 30 may be made of a soft, malleable material, such as plastic.

Gathering member 44 gathers the sheets of ornamental material 24 and secures these sheets together above post 28 (see FIG. 4). Preferably, gathering member 44 is a twist-tie. However, the use of other gathering members, such as a ring, a rubber band or a lock-tie, is likewise contemplated.

To assemble device 20, the sheets of ornamental material 24 are pulled to a taut position and centered over post 28. The sheets of ornamental material 24 are pushed onto post 28 to in turn, force post 28 through aperture 38. Securement member 30 is then attached to proximal end 32 of post 28. The sheets of ornamental material 24 are gathered above post 28 and secured by securement member 30. The sheets of ornamental material 24 are spread open in a decorative fashion for placing on the exterior of an automobile. Finally, base member 26 is secured to the exterior of an automobile.

The invention further comprises a method for making an ornamental device for attachment to a surface. The method comprises the steps of: 1) providing at least one sheet of ornamental material, having an aperture therethrough, the aperture having a width; 2) providing an attachment device including a post having a width, a proximal end and a distal end, the distal end of the post extending through the aperture of the at least one sheet of ornamental material; the attachment device further including a base member operably connected to the proximal end of the post, the base member having a width greater than the width of the aperture of the at least one sheet of ornamental material; the attachment device further including a securement device, positioned on the distal end of the post, so that the at least one sheet of ornamental material is positioned between the base member and the securement device, the securement device having a width greater than the width of the aperture of the at least one sheet of ornamental material, the securement device further being operably configured to grippingly engage the post, to resist removal of the securement device from the post; the base member further including a suction cup, for enabling attachment of the ornamental device to a surface; 3) gathering the at least one sheet of ornamental material into a ball-like configuration; and 4) securing the base member of the ornamental device to the surface.

The foregoing description and drawings merely explain and illustrate the invention, and the invention is not limited thereto except insofar as the appended claims are so limited as those skilled in the art who have the disclosure before them will be able to make modifications and variations therein without departing from the scope of the invention.

What is claimed is:

1. An ornamental device for attachment to a surface, comprising:

at least one sheet of ornamental material, having an aperture therethrough, the aperture having a width; and an attachment device including a post having a width, a proximal end and a distal end, the distal end of the post extending through the aperture of the at least one sheet of ornamental material;

the attachment device further including a base member operably connected to the proximal end of the post, the base member having a width greater than the width of the aperture of the at least one sheet of ornamental material;

the attachment device further including a securement device, positioned on the distal end of the post, so that the at least one sheet of ornamental material is positioned between the base member and the securement device, the securement device having a width greater than the width of the aperture of the at least one sheet of ornamental material, the securement device further being operably configured to grippingly engage the post, to resist removal of the securement device from the post;

the base member further including a suction cup, for enabling attachment of the ornamental device to the surface.

2. The ornamental device according to claim 1 further comprising a gathering member, for gathering the at least one sheet of ornamental material around the post.

3. The ornamental device according to claim 2 wherein the gathering member is selected from the group consisting of an elastic band, a twist-tie and a lock-tie.

4. The ornamental device according to claim 1 wherein the width of the post is substantially identical at the proximal and distal ends.

5. The ornamental device according to claim 1 wherein the width of the post is larger at the distal end than at the proximal end.

6. The ornamental device according to claim 1 wherein the post is made of plastic.

7. The ornamental device according to claim 1 wherein the post is made of metal.

8. The ornamental device according to claim 1 wherein the at least one sheet of ornamental material includes four sheets of ornamental material.

9. The ornamental device according to claim 1 wherein the at least one sheet of ornamental material is selected from the group consisting of paper and plastic.

10. The ornamental device according to claim 1 wherein the base member is dome-shaped.

11. The ornamental device according to claim 1 wherein the base member is made of plastic.

12. The ornamental device according to claim 1 wherein the base member is made of metal.

13. The ornamental device according to claim 1 wherein the securement device is a washer, having an aperture having one or more inwardly projecting teeth for engaging the post, for providing resistance to movement of the securement device along the post.

14. The ornamental device according to claim 13 wherein the washer includes six teeth.

15. The ornamental device according to claim 1 wherein the securement device is made of metal.

16. The ornamental device according to claim 1 wherein the securement device is made of plastic.

17. A method for making an ornamental device for attachment to a surface, comprising the steps of:

providing at least one sheet of ornamental material, having an aperture therethrough, the aperture having a width; and providing an attachment device including a post having a width, a proximal end and a distal end, the distal end of the post extending through the aperture of the at least one sheet of ornamental material;

the attachment device further including a base member operably connected to the proximal end of the post, the base member having a width greater than the width of the aperture of the at least one sheet of ornamental material;

the attachment device further including a securement device, positioned on the distal end of the post, so that the at least one sheet of ornamental material is positioned between the base member and the securement device, the securement device having a width greater than the width of the aperture of the at least one sheet of ornamental material, the securement device further being operably configured to grippingly engage the post, to resist removal of the securement device from the post;

the base member further including a suction cup, for enabling attachment of the ornamental device to the surface;

gathering the at least one sheet of ornamental material around the post; and securing the base member of the ornamental device to the surface.

18. The method of claim 17 further comprising the step of applying an adhesive to the suction cup prior to attachment of the ornamental device to the surface.

* * * * *